United States Patent
Xue et al.

(10) Patent No.: US 9,832,666 B2
(45) Date of Patent: Nov. 28, 2017

(54) DEVICE AND METHOD FOR SELF-INTERFERENCE CANCELLATION

(71) Applicant: Intel Corporation, Santa Clara, CA (US)

(72) Inventors: Feng Xue, Redwood City, CA (US); Yang-Seok Choi, Portland, OR (US); Shilpa Talwar, Los Altos, CA (US); Roya Doostnejad, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 14/577,317

(22) Filed: Dec. 19, 2014

(65) Prior Publication Data

US 2016/0183100 A1    Jun. 23, 2016

(51) Int. Cl.
*H04W 24/02*    (2009.01)
*H04B 1/525*    (2015.01)

(52) U.S. Cl.
CPC ............ *H04W 24/02* (2013.01); *H04B 1/525* (2013.01)

(58) Field of Classification Search
CPC .......... H04W 64/00; G01S 5/12; G01S 19/07; G01S 19/11; G01S 2205/006
See application file for complete search history.

(56) References Cited

U.S. PATENT DOCUMENTS 5,943,606 A * 8/1999 Kremm ................ H04B 7/1855
342/358

2013/0286903 A1    10/2013 Khojastepour et al.
2014/0112254 A1 * 4/2014 Lindoff ............... H04W 74/002
370/328
2016/0127114 A1 * 5/2016 Kim ..................... H04B 17/345
370/252

FOREIGN PATENT DOCUMENTS

| CN | 1239612 A | 12/1999 |
| CN | 103516638 A | 1/2014 |
| CN | 103716061 A | 4/2014 |
| CN | 103718636 A | 4/2014 |
| CN | 103957182 A | 7/2014 |
| WO | WO-2014/200212 A1 | 12/2014 |

OTHER PUBLICATIONS

Office Action dated May 16, 2016 for European Patent Application No. 15194813.0.
Taiwan Patent Office, Office Action and Search Report iissued in patent Taiwan Patent No. 104137722, dated Dec. 13, 2016. (w/English translation).
Chinese Office Action received Aug. 18, 2017 for Chinese Patent Application No. 201510801574.3.

* cited by examiner

*Primary Examiner* — Chandrahas Patel
(74) *Attorney, Agent, or Firm* — Schiff Hardin LLP

(57) ABSTRACT

A method for self-interference cancellation in a wireless communication device. The wireless communication device has an estimator, a transmitter and a cancellation device. The estimator is configured to estimate a known signal received from a second wireless communication device when the second wireless communication device is utilized less than a predetermined threshold. The transmitter is configured to transmit within a coherence time of the estimated known signal, a predetermined signal. The cancellation device is configured to cancel the estimated known signal from a received signal.

25 Claims, 5 Drawing Sheets

$Y(t)$ = Received Signal = $H_1 s_{CRS,1}(t) + H_2 s_{CRS,2} + ... + H_K s_{CRS,K}(t) + f(X(t)) + I(t)$
$U(t)$ = Estimated Known Signal = $H_1 s_{CRS,1}(t) + H_2 s_{CRS,2} + ... + H_K s_{CRS,K}(t)$
$F() = Y(t) - U(t)$

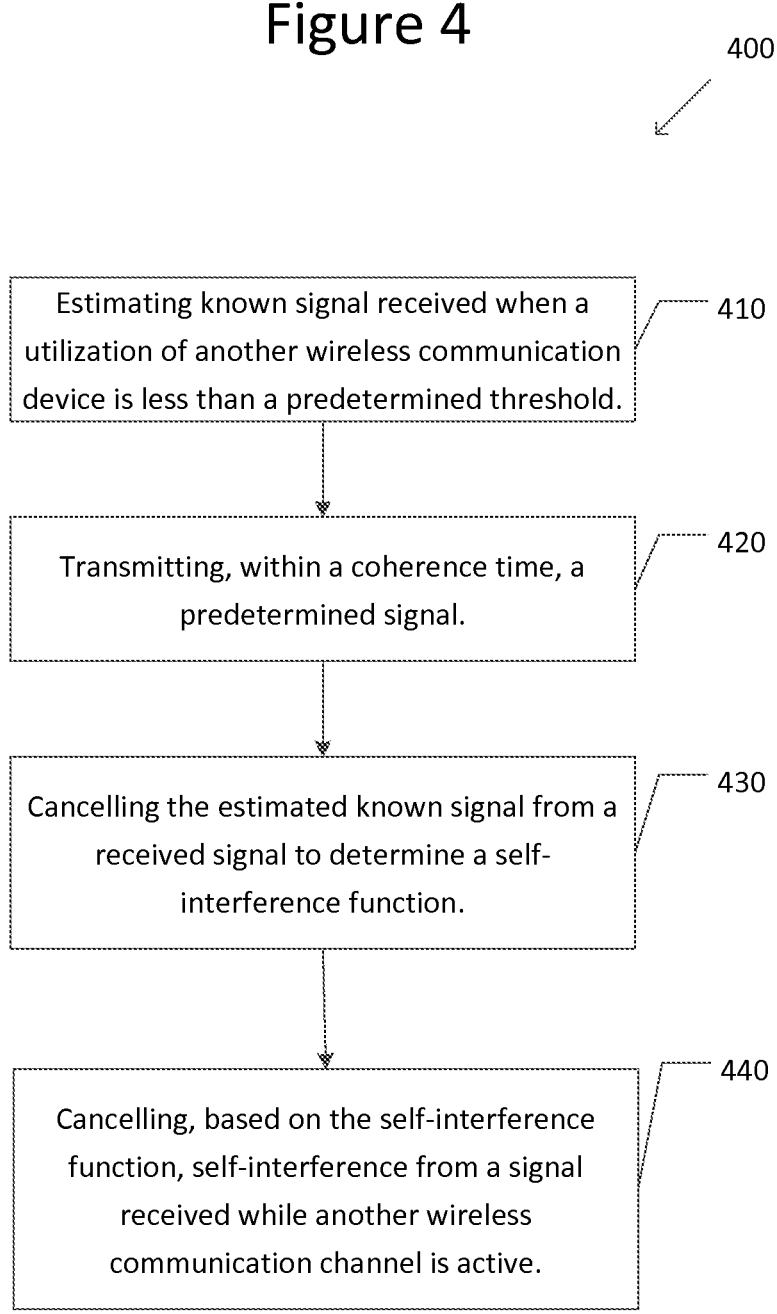

DEVICE AND METHOD FOR SELF-INTERFERENCE CANCELLATION

BACKGROUND

In communications, especially Long Term Evolution (LTE) cellular communications, when a communication device is transmitting in the uplink, the uplink signal often leaks into the downlink frequency band. While the power of the leaked signal is small as compared with the power of the transmit signal, the leaked signal power is still significant enough to prevent the base station from scheduling downlink transmissions on the full downlink frequency band. This is a waste of resources.

To alleviate this so-called self-interference, a cancellation algorithm may estimate self-interference from the transmitter at the receiver, and then cancel the estimated self-interference. This estimation, typically accomplished by adapting a filter, is challenging as the mapping from transmitted signal to interference is highly nonlinear and may have memory effect.

BRIEF DESCRIPTION OF THE DRAWINGS

FIG. 4 is a flowchart illustrating a method of self-interference cancellation using the wireless communication device of FIG. 1.

DESCRIPTION OF THE EMBODIMENTS

The present disclosure is directed to a wireless communication device and method for self-interference cancellation. Before the actual self-interference cancellation (SIC), an estimator establishes a self-interference function or mapping between the transmitter and the interfering transmission signal leaking to the receiver. To increase the accuracy of the self-interference function, influence from external transmissions should be minimized, such as when the signals transmitted from the base station are mainly only known signals. Then during normal operation, the self-interference function may be used to generate a signal without self-interference cancellation.

The self-interference cancellation is described herein in the context of a wireless communication device operating with the Long Term Evolution (LTE) downlink (DL) signaling structure. However, the disclosure is not limited in this respect. The self-interference cancellation is applicable to any wireless communication standard where in the downlink there is a known signal and low utilization. The known signal may be a reference signal, a cell-specific reference signal (CRS), a pilot signal, etc.

A base station is required to transmit regular reference signals. LTE Enhanced ICIC (eICIC) base stations (eNB) transmit Almost Blank Subframes (ABS), which include mostly cell-specific reference signals (CRSs), with some minimal signals such as Physical Broadcast Channel (PBCH), Primary Synchronization Channel (PSS), and Secondary Synchronization Channel (SSS). During ABS there is no user data transmitted and thus is a preferable time to establish the self-interference cancellation function with high accuracy.

Figure 1:
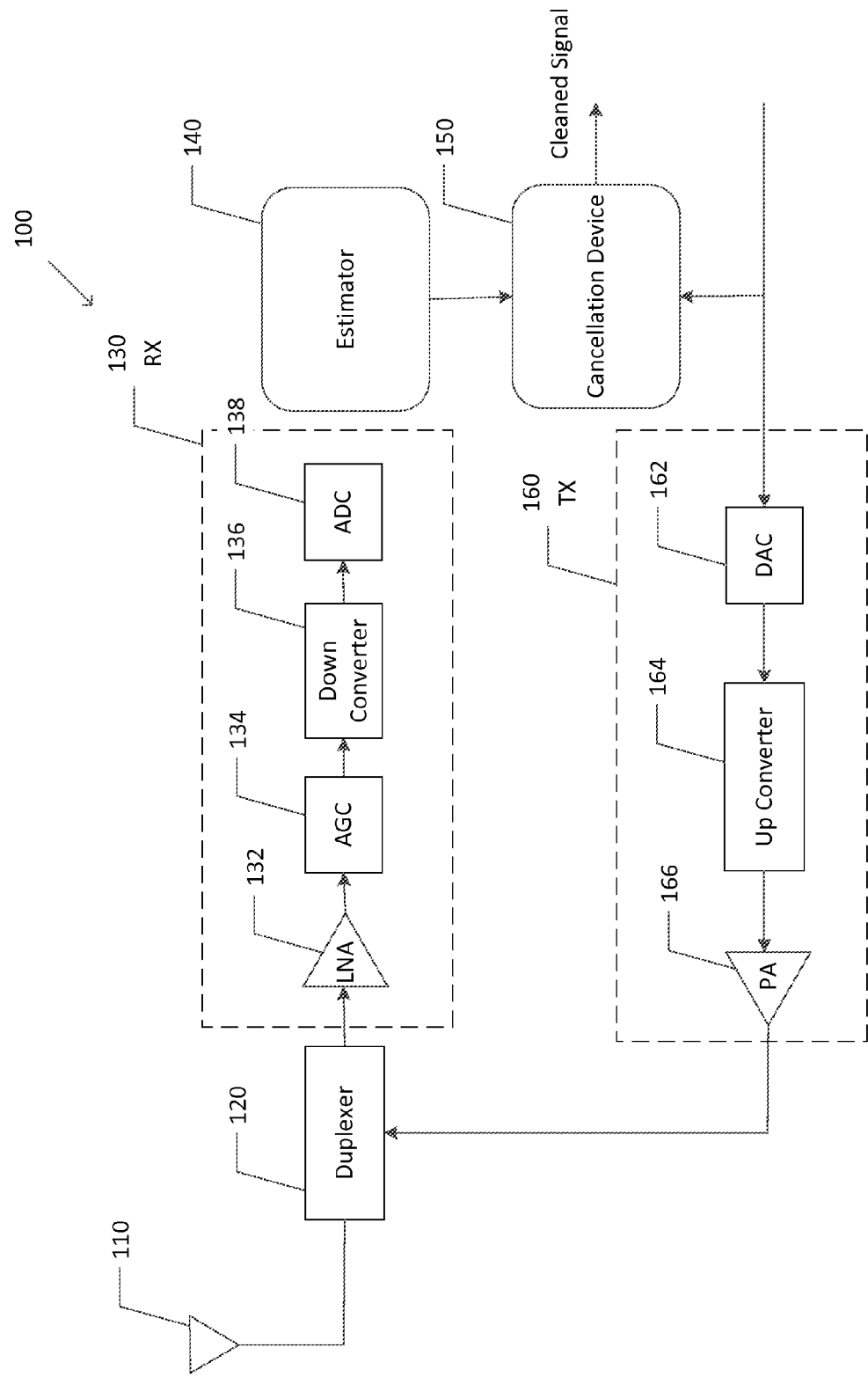
FIG. 1 illustrates a schematic diagram of a wireless communication device.

FIG. 1 illustrates a schematic diagram of a wireless communication device 100. The wireless communication device 100 may comprise an antenna 110, a duplexer 120, a receiver 130, an estimator 140, a cancellation device 150, and a transmitter 160.

In LTE, the uplink (UL) is on a different frequency band from the downlink (DL). Because the duplexer 120 is imperfect, there is still some degradation in signal quality due to self-interference. It should be noted that the disclosure is not limited to the uplink and downlink being on different frequency bands, but is equally applicable to wireless communication standards where the uplink and downlink are on a same frequency band.

The receiver 130 may include, for example, a low noise amplifier (LNA) configured to remove noise from a received signal, an automatic gain control (AGC) 134 configured to adjust the gain of the received signal, a down converter 136 configured to covert the received signal centered at an intermediate frequency (IF) to a baseband signal centered at zero frequency, and an analog-to-digital converter 138.

The transmitter 160 may include, for example, a digital-to-analog converter 162, and up converter 164 configured to convert a baseband signal centered at zero frequency to a signal centered at an IF, and a power amplifier (PA) 166.

By way of overview, before the actual self-interference cancellation is performed, the estimator 140 establishes a self-interference function. More specifically, the estimator 140 estimates a cell-specific reference signal (CRS), that is, a known signal in LTE received from the base station eNB during a low load ABS subframe. The transmitter 160 then transmits within a coherence time of this CRS estimation a predetermined signal X(t). The cancellation device 150 cancels the estimated CRS from a received signal Y(t), which includes self-interference from the transmitted predetermined signal X(t). The cancelling results in a self-interference function f(X), which is then used during normal operation to cancel self-interference. A more detailed description of this self-interference function establishment and self-interference cancellation is explained in more detail below with respect to FIGS. 3A and 3B.

Figure 2:
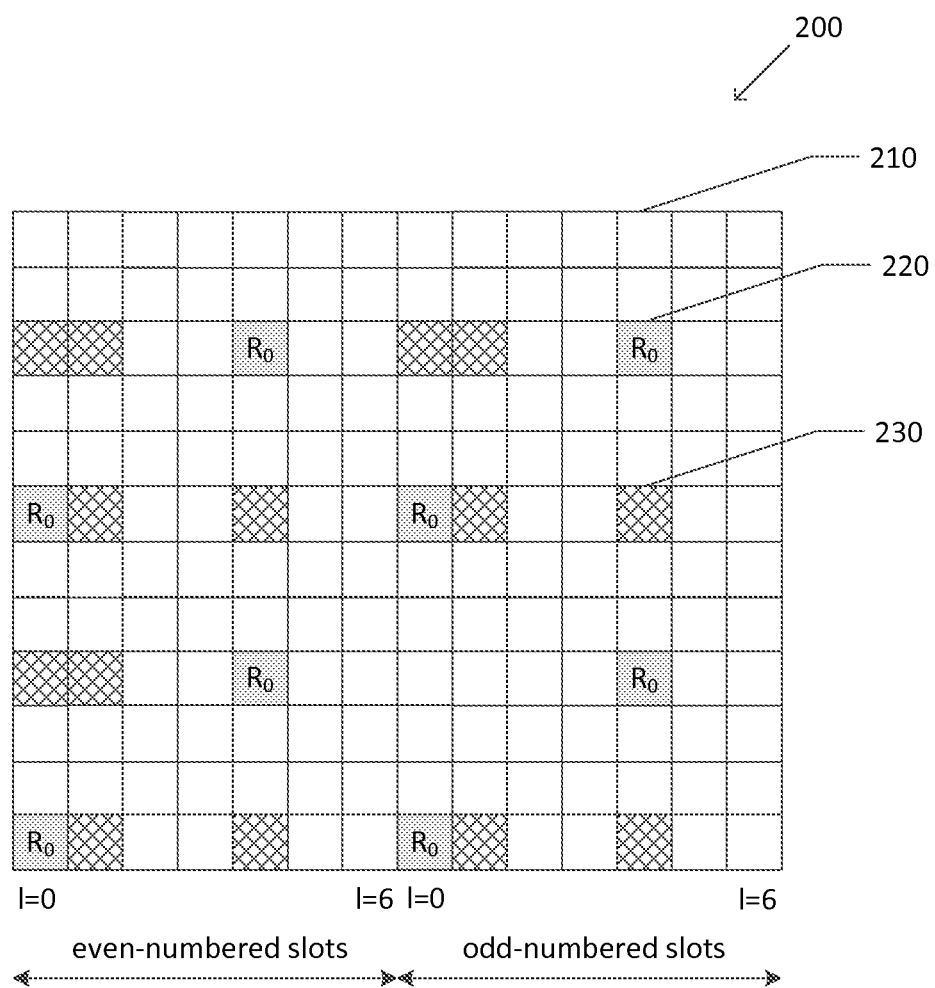
FIG. 2 illustrates a typical time-frequency resource map in a mobile communication standard, such as LTE.

FIG. 2 illustrates an LTE resource grid 200 of frequency versus time. A resource grid 200 comprises resource elements, which is the basic unit of physical resource in LTE. There is one resource grid 200 defined per antenna port. The resource element $R_0$ 220 represents antenna port 0, and the hatched resource elements 230 represent other antenna ports in other respective resource grids. The blank resource elements 210 are not associated with any antenna port. The self-interference function f( ) determination is performed over the entire resource grid 200 after the resource element $R_0$ 220 representing antenna port 0 and the hatched resource elements 230 representing the other antenna ports are not transmitting, such as during an ABS or low load subframe.

Figure 3A:
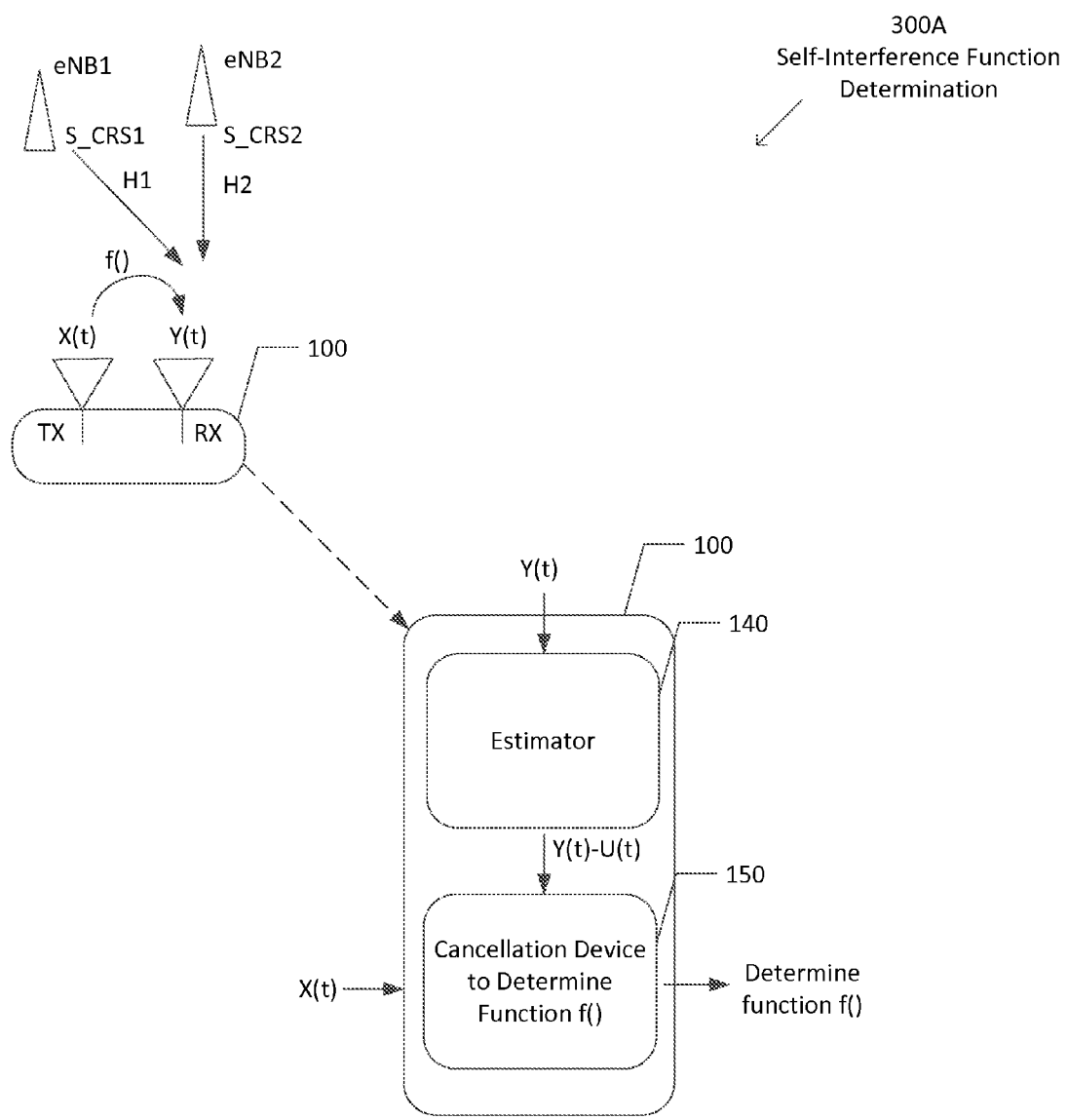
FIG. 3A illustrates a schematic diagram of the wireless communication device of FIG. 1 during a training operation.

FIG. 3A illustrates a schematic diagram of a wireless communication system 300A including the wireless communication device 100 of FIG. 1 during a determination of a self-interference function f( ). As mentioned above, before the actual self-interference cancellation is performed, the estimator 140 determines the self-inference function during ABS or low load subframes.

The wireless communication system 300A includes one or more base stations eNB1, eNB2 transmitting cell-specific reference signals S_CRS1, S_CRS2. The wireless communication device 100 monitors the downlink signals from the base stations eNB1, eNB2 to detect their cell identifiers. This operation is performed in standard LTE and typical infrastructure-based communications.

The self-interference function establishment of this disclosure comprises estimating a known signal, transmitting a predetermined signal, and cancelling the estimated known signal from a received signal. Each of these steps is described in more detail below.

Estimate Known Signal:

Known cell-specific reference signals CRS from one or more base stations eNB is estimated by the wireless communication device's estimator 140. This estimation is performed during a low load or ABS subframe in the downlink so as to increase the estimation accuracy. The ABS subframe is specific to LTE. For wireless communication standards generally, a low load subframe may be defined in frequency and time based on a utilization threshold. A low load subframe may be, for example, somewhere between 20% and 50%. The estimated signal U(t), generated when the base stations are transmitting CRS sequences, is represented by Equation 1 as follows:

$$U(t)=H_1 s_{CRS,1}(t)+H_2 s_{CRS,2}+ \ldots +H_K s_{CRS,K}(t) \quad \text{(Equation 1)}$$

where $H_k$ represents the channel from k-th eNB, and $S_{CRS,K}$ represents the CRS sequence from k-th base station eNB. There are many known methods for the wireless communication device to determine the CRS sequences and the channel information H_k, k=1, ... K.

Transmit Predetermined Signal:

Next, a predetermined signal X(t) is by the transmitter 160 within the coherence time when the CRS estimate is still valid. As is known, the coherence time is the time duration over which the channel impulse response H is considered to be not varying much. This predetermined signal may be represented in Equation 2 as follows:

$$X(t):=x(t_1), \ldots, x(t_L) \quad \text{(Equation 2)}$$

Cancel Estimated Known Signal from Received Signal:

The downlink signal based on CRS sequence is reconstructed by the estimator 140 at the sampling points. The reconstructed received sequence U(t) due to the reference signals is represented by Equation 3 as follows:

$$U(t):=u(t_1), \ldots, u(t_L) \quad \text{(Equation 3)}$$

The received signal Y(t) at the receiver 130 is represented by Equation 4 as follows:

$$Y(t):=y(t_1), \ldots, y(t_L) \quad \text{(Equation 4)}$$

The received signal Y(t) during ABS subframes is represented by Equation 5 as follows:

$$Y(t)=H_1 s_{CRS,1}(t)+H_2 s_{CRS,2}(t)+ \ldots +H_K s_{CRS,K}(t)+f(X(t))+I(t) \quad \text{(Equation 5)}$$

where $H_k$ represents the channel from k-th eNB, $s_{CRS,k}(t)$ represents the CRS sequence from k-th eNB, and f(X(t)) represents the leakage signal from the transmitted signal X(t). I(t) represents other signals such as synchronization signals, including, for example, Primary Synchronization Signal (PSS), secondary Synchronization Signal (SSS), Physical Broadcast Channel (PBCH) signals, and minor interference signals.

The mapping or self-interference function f( ) is what the overall self-interference cancellation algorithm is attempting to determine. This is the function that is used during normal operation for the self-interference cancellation.

The self-interference mapping function f( ) from the transmitter 160 to the receiver 130 is determined by the estimator 140 canceling the reconstructed CRS sequence U(t) from the received signal Y(t), as represented by Equation 6 as follows:

$$f(X(t))=Y(t)-U(t) \quad \text{(Equation 6)}$$

where U(t) represents only the downlink CRS sequence without interference from the known transmitted signal X(t), though therefore may be downlink CRS sequence from more than one base station eNB.

Figure 3B:
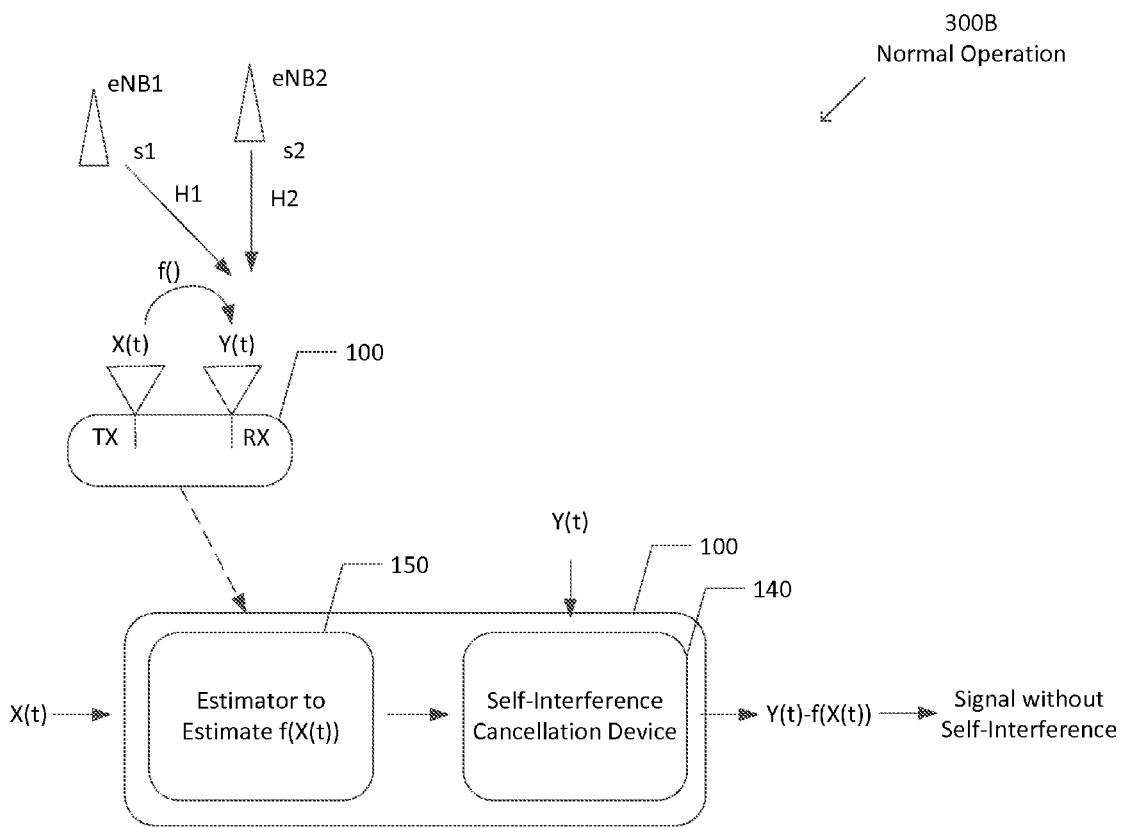
FIG. 3B illustrates a schematic diagram of the wireless communication device of FIG. 1 during normal operation.

FIG. 3B illustrates a schematic diagram of the wireless communication system 300B including the wireless communication device 100 of FIG. 1 during normal operation. Note that wireless communication system 300A and 300B are the same system, but at different periods of time.

After the self-interference function f( ) is established as described above with respect to FIG. 3A, there is actual self-interference cancellation during normal operation, as described in detail below with respect to FIG. 3B.

Perform Self-Interference Cancellation:

The self-interference function f( ) may be used by the cancellation device 150 during normal operation, that is when there is channel traffic, to cancel self-interference from the transmitter 160 to the receiver 130. Basically, the self-interference function f( ) is used to reconstruct the self-interference f(X(t)) from the transmitter 160. The signal without self-interference may be represented by Equation (7) as follows:

$$\text{Signal without Self-Interference}=Y(t)-f(X(t)) \quad \text{(Equation 7)}$$

FIG. 4 is a flowchart illustrating a method of self-interference cancellation using the wireless communication device 100 of FIG. 1.

At Step 410, a known signal, such as a CRS, received from a base station eNB is estimated by the estimator 140 when a utilization of the base station eNB is less than a predetermined threshold.

At Step 420, a predetermined signal X(t) is transmitted by the transmitter 160 within a coherence time.

Next, at Step 430, the estimated known signal U(t) is cancelled from a received signal Y(t) by the cancellation device 150. The cancelling results in a self-interference function f( ).

Finally, at Step 440, while another wireless communication channel is active, self-interference is cancelled from a received signal Y(t) based on the self-interference function f( ) to result in a signal without self-interference.

The training described above occurs during an ABS or low load subframe. Alternatively, the training may occur during normal transmission between the base station(s) eNB and the wireless communication device 100. This alternative training algorithm is similar to the algorithm described above except that the wireless communication device 100 estimates the f( ) function even when the transmitter 160 is transmitting data. In this alternative algorithm, the wireless communication device 100 estimates CRS signals and cancels the estimated CRS signals. Then the wireless communication device 100 estimates the f( ) function. An iterative algorithm may be applied to improve this estimation and for convergence.

A computer program product may be embodied on a non-transitory computer-readable medium comprising program instructions configured such that when executed by processing circuitry cause the processing circuitry to implement the method of FIG. 4.

The training sequence is performed at least once. However, additional training sequences may be performed at any time deemed necessary to accomplish accurate self-interference cancellation.

In an alternative process the training sequence may be performed during normal operation rather than during an ABS or low load subframe, as described above. Estimation and cancellation is jointly optimized in an iterative process rather than being performed separately. First the CRS is estimated, then some self-interference is cancelled from the received signal, then the self-interference function f( ) is estimated but perhaps only to 80% accuracy. A second round of estimation is then performed in an iterative loop.

The self-interference cancellation has been described as being performed in a wireless communication device 100, such as a mobile communication device, communicating with a base station eNB. Alternatively, this self-interference cancellation may be performed in a base station communicating with a mobile communication device. Also, the description is mainly with respect to one mobile communication device and one base station, however, there may be a plurality of base stations.

Example 1 is a wireless communication device, comprising an estimator configured to estimate a known signal received from a second wireless communication device when the second wireless communication device is utilized less than a predetermined threshold; a transmitter configured to transmit within a coherence time of the estimated known signal, a predetermined signal; and a cancellation device configured to cancel the estimated known signal from a received signal.

In Example 2, the subject matter of Example 1, wherein the cancellation device is configured to produce, as a result of the cancelling, a self-interference function.

In Example 3, the subject matter of Example 2, wherein the cancellation device is further configured to cancel, based on the self-interference function, self-interference from the received signal.

In Example 4, the subject matter of Example 1, wherein the known signal is a reference signal.

In Example 5, the subject matter of Example 1, wherein the known signal is a cell-specific reference signal (CRS).

In Example 6, the subject matter of Example 1, wherein the known signal is a pilot signal.

In Example 7, the subject matter of Example 1, wherein the known signal is estimated during an almost blank subframe (ABS).

In Example 8, the subject matter of Example 1, wherein the known signal is estimated during a low load subframe.

In Example 9, the subject matter of Example 1, wherein the second wireless communication device is a base station.

In Example 10, the subject matter of Example 1, further comprising a plurality of second wireless communication devices.

In Example 11, the subject matter of Example 1, wherein the wireless communication device is a mobile communication device.

Example 12 is a method for self-interference cancellation in a wireless communication device, the method comprising estimating, by an estimator, a known signal received from a second wireless communication device when the second wireless communication device is utilized less than a predetermined threshold; transmitting, by a transmitter and within a coherence time of the estimated known signal, a predetermined signal; and cancelling, by a cancellation device, the estimated known signal from a received signal.

In Example 13, the subject matter of Example 12, wherein the cancelling step comprises producing a self-interference function.

In Example 14, the subject matter of Example 13, further comprising cancelling, based on the self-interference function, self-interference from the received signal while the second wireless communication channel is active.

In Example 15, the subject matter of Example 12, wherein the known signal is a reference signal.

In Example 16, the subject matter of Example 12, wherein the known signal is a cell-specific reference signal (CRS).

In Example 17, the subject matter of Example 12, wherein the known signal is a pilot signal.

In Example 18, the subject matter of Example 12, wherein the known signal is estimated during an almost blank subframe (ABS).

In Example 19, the subject matter of Example 12, wherein the second wireless communication device is a base station.

In Example 20, the subject matter of Example 12, further comprising a plurality of second wireless communication devices.

In Example 21, the subject matter of Example 12, further comprising repeating the estimating, transmitting and cancelling steps.

In Example 22, the subject matter of Example 12, wherein the estimating, transmitting, and cancelling steps are performed iteratively.

Example 23 is a wireless communication device comprising an estimating means for estimating a known signal received from a second wireless communication device when the second wireless communication device is utilized less than a predetermined threshold; a transmitting means for transmitting within a coherence time of the estimated known signal, a predetermined signal; and a cancellation means for cancelling the estimated known signal from a received signal.

In Example 24, the subject matter of Example 23, wherein the known signal is a signal selected from the group of signals consisting of a reference signal, a cell-specific reference signal (CRS), and a pilot signal.

Example 25 is a computer program product embodied on a non-transitory computer-readable medium comprising program instructions configured such that when executed by processing circuitry cause the processing circuitry to implement the method of Example 12.

In Example 26, the subject matter of any of Examples 2-3, wherein the known signal is a reference signal.

In Example 27, the subject matter of any of Examples 2-4, wherein the known signal is a cell-specific reference signal (CRS).

In Example 28, the subject matter of any of Examples 2-5, wherein the known signal is a pilot signal.

In Example 29, the subject matter of any of Examples 2-6, wherein the known signal is estimated during an almost blank subframe (ABS).

In Example 30, the subject matter of any of Examples 2-7, wherein the known signal is estimated during a low load subframe.

In Example 31, the subject matter of any of Examples 2-8, wherein the other wireless communication device is a base station.

In Example 32, the subject matter of any of Examples 2-9, further comprising a plurality of other wireless communication devices.

In Example 33, the subject matter of any of Examples 2-10, wherein the wireless communication device is a mobile communication device.

Example 34 is a wireless communication device, comprising an estimating means for estimating a known signal received from another wireless communication device when the other wireless communication device is utilized less than a predetermined threshold; a transmitting means for transmitting within a coherence time of the estimated known signal, a predetermined signal; and a cancellation means for cancelling the estimated known signal from a received signal.

In Example 35, the subject matter of Example 34, wherein the cancellation means produces, as a result of the cancelling, a self-interference function, and the cancellation means comprises means for cancelling, based on the self-interference function, self-interference from a signal received.

In Example 35, the subject matter of Example 34, wherein the known signal is a reference signal.

In Example 37, the subject matter of any of Examples 12-14, wherein the known signal is a reference signal.

In Example 38, the subject matter of any of Examples 12-15, wherein the known signal is a cell-specific reference signal (CRS).

In Example 39, the subject matter of any of Examples 12-16, wherein the known signal is a pilot signal.

In Example 40, the subject matter of any of Examples 12-17, wherein the known signal is estimated during an almost blank subframe (ABS).

In Example 41, the subject matter of any of Examples 12-18, wherein the other wireless communication device is a base station.

In Example 42, the subject matter of any of Examples 12-19, further comprising a plurality of other wireless communication devices.

In Example 43, the subject matter of any of Examples 12-20, further comprising repeating the estimating, transmitting and cancelling steps.

In Example 44, the subject matter of any of Examples 12-21, wherein the estimating, transmitting, and cancelling steps are performed iteratively.

Example 45 is a computer program product embodied on a non-transitory computer-readable medium comprising program instructions configured such that when executed by processing circuitry cause the processing circuitry to implement the subject matter of any of Examples 12-22.

Example 46 is an apparatus substantially as shown and described.

Example 47 is a method substantially as shown and described.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present application. This application is intended to cover any adaptations or variations of the specific embodiments discussed herein.

The invention claimed is:

1. A wireless communication device, comprising:
   an estimator configured to estimate a known signal received from a second wireless communication device when the second wireless communication device is utilized less than a predetermined threshold;
   a transmitter configured to transmit within a coherence time of the estimated known signal, a predetermined signal; and
   a cancellation device configured to cancel the estimated known signal from a received signal.

2. The wireless communication device of claim 1, wherein the cancellation device is configured to produce, as a result of the cancelling, a self-interference function.

3. The wireless communication device of claim 2, wherein the cancellation device is further configured to cancel, based on the self-interference function, self-interference from the received signal.

4. The wireless communication device of claim 1, wherein the known signal is a reference signal.

5. The wireless communication device of claim 1, wherein the known signal is a cell-specific reference signal (CRS).

6. The wireless communication device of claim 1, wherein the known signal is a pilot signal.

7. The wireless communication device of claim 1, wherein the known signal is estimated during an almost blank subframe (ABS).

8. The wireless communication device of claim 1, wherein the known signal is estimated during a low load subframe.

9. The wireless communication device of claim 1, wherein the second wireless communication device is a base station.

10. The wireless communication device of claim 1, further comprising a plurality of other wireless communication devices.

11. The wireless communication device of claim 1, wherein the wireless communication device is a mobile communication device.

12. A method for self-interference cancellation in a wireless communication device, the method comprising:
    estimating, by an estimator, a known signal received from a second wireless communication device when the second wireless communication device is utilized less than a predetermined threshold;
    transmitting, by a transmitter and within a coherence time of the estimated known signal, a predetermined signal; and
    cancelling, by a cancellation device, the estimated known signal from a received signal.

13. The method of claim 12, wherein the cancelling step comprises producing a self-interference function.

14. The method of claim 13, further comprising:
    cancelling, based on the self-interference function, self-interference from the received signal while the second wireless communication channel is active.

15. The method of claim 12, wherein the known signal is a reference signal.

16. The method of claim 12, wherein the known signal is a cell-specific reference signal (CRS).

17. The method of claim 12, wherein the known signal is a pilot signal.

18. The method of claim 12, wherein the known signal is estimated during an almost blank subframe (ABS).

19. The method of claim 12, wherein the second wireless communication device is a base station.

20. The method of claim 12, further comprising a plurality of second wireless communication devices.

21. The method of claim 12, further comprising:
repeating the estimating, transmitting and cancelling steps.

22. The method of claim 12, wherein the estimating, transmitting, and cancelling steps are performed iteratively.

23. A computer program product embodied on a non-transitory computer-readable medium comprising program instructions configured such that when executed by processing circuitry cause the processing circuitry to implement the method of claim 12.

24. A wireless communication device, comprising:
an estimating means for estimating a known signal received from a second wireless communication device when the second wireless communication device is utilized less than a predetermined threshold;
a transmitting means for transmitting within a coherence time of the estimated known signal, a predetermined signal; and
a cancellation means for cancelling the estimated known signal from a received signal.

25. The wireless communication device of claim 24, wherein the known signal is a signal selected from the group of signals consisting of a reference signal, a cell-specific reference signal (CRS), and a pilot signal.

* * * * *